[11] 3,602,322

| [72] | Inventor | Dale C. Gorsuch |
| | | 7030 Baker Blvd., Fort Worth, Tex. 76118 |
| [21] | Appl. No. | 770,148 |
| [22] | Filed | Oct. 24, 1968 |
| [45] | Patented | Aug. 31, 1971 |

[54] FLUID FLOW MONITORING SYSTEM FOR WELL DRILLING OPERATIONS
12 Claims, 5 Drawing Figs.

[52] U.S. Cl. .................................................. 175/48, 73/155
[51] Int. Cl. ................................................... E21b 21/04
[50] Field of Search........................................... 175/48; 73/196, 155

[56] References Cited
UNITED STATES PATENTS

| 2,832,566 | 4/1958 | Bielstein.................. | 73/155 X |
| 2,925,251 | 2/1960 | Arps........................ | 175/48 X |
| 2,964,116 | 12/1960 | Peterson.................. | 175/48 |
| 2,966,059 | 12/1960 | Dower..................... | 175/48 X |
| 3,248,938 | 5/1966 | Hill......................... | 73/155 |
| 3,374,341 | 3/1968 | Klotz....................... | 175/48 X |

*Primary Examiner*—Nile C. Byers, Jr.
*Attorney*—Wofford and Felsman

ABSTRACT: For well drilling operations, a fluid flow measuring system that senses well input and output flows and converts them into compared electrical analogues for signaling the operator upon the occurrence of imbalance.

FLUID FLOW MONITORING SYSTEM FOR WELL DRILLING OPERATIONS

BACKGROUND AND GENERAL DISCUSSION

Previously known systems for monitoring the quantity of fluid pumped into a well bore during earth boring operations and the quantity of fluid returning from the well bore for the purpose of determining fluid gain or fluid loss have a number of significant disadvantages. Such systems are needed in the interest of safety to enable drill rig operators to take immediate corrective action if circulation is lost or other circulation problems arise. One feature of my invention is the provision in a fluid flow monitoring system of an improved stroke meter for converting the stroke rate of the input fluid pump into an electrical analogue. I utilize an electrical switch actuated by the pump and connected with a monotonic function generator and with a sample and hold circuit means, both of which cooperate to generate a voltage directly proportional to the time between successive pump strokes. In addition, a reciprocal circuit means computes the reciprocal of the voltage for obtaining an electrical analogue of the frequency of the pump strokes. The frequency analogue is then multiplied to produce an analogue of the input fluid flow, which is compared in a differential flow comparator with an electrical analogue generated by a fluid output flow sensor.

Another feature of my invention is the provision of a cutoff circuit switch means to ground the output signal when the voltage generated by the monotonic function generator rises to a higher value than could exist if the pump were running at its slowest rate. There are instances in which the pump at its slowest rate. There are instances in which the pump is intentionally stopped, as when pulling the drill string from the well. In such instances the voltage from the stroke rate meter would hold at its last value, giving an erroneous indication to the differential flow comparator and meter of well input fluid flow. Although the operator of the well might recognize that the reading was erroneous, it is advantageous to prevent possible misinterpretation.

Another feature of my invention is the connection of the fluid output flow sensor with an adjustable gain amplifier for balancing the flow to the differential flow comparator with the signal from well input fluid flow sensor. There are instances where the output and the input flows into the well will be measured to be different but the operator's experience indicates they are in fact equal. During fast drilling, a substantial amount of solids may be entrained in the output, for example, such that the output flow sensor erroneously senses that the output flow of fluid is significantly increased. It is advantageous therefore to provide means to balance the input of the electrical analogues of the input fluid flow and the output fluid flow into the differential flow comparator.

Another feature of my invention is the provision of a servomotor means and actuating circuit which vary the output of the adjustable gain amplifier in the electrical analogue circuit simulating well output fluid flow for the purpose of balancing flow to the adjustable gain amplifier in an advantageous manner when the operator actuates a selector switch.

Another feature is to integrate the voltage received from the differential flow comparator to obtain total, as well as instantaneous, gain or loss of fluid.

Another feature of my invention is the provision in the above discussed electrical analogue computer system of a stroke counter means useful in computing the total volume of fluid required to fill the bore hole during requisite fluid filling operation and automatic cutoff means to stop the computation when the well becomes filled.

Another feature of my invention is the provision of visual and audio signaling components in combination with the above features for forcefully indicating when the selected flow conditions occur.

DESCRIPTION OF A PREFERRED EMBODIMENT

Figure 1:
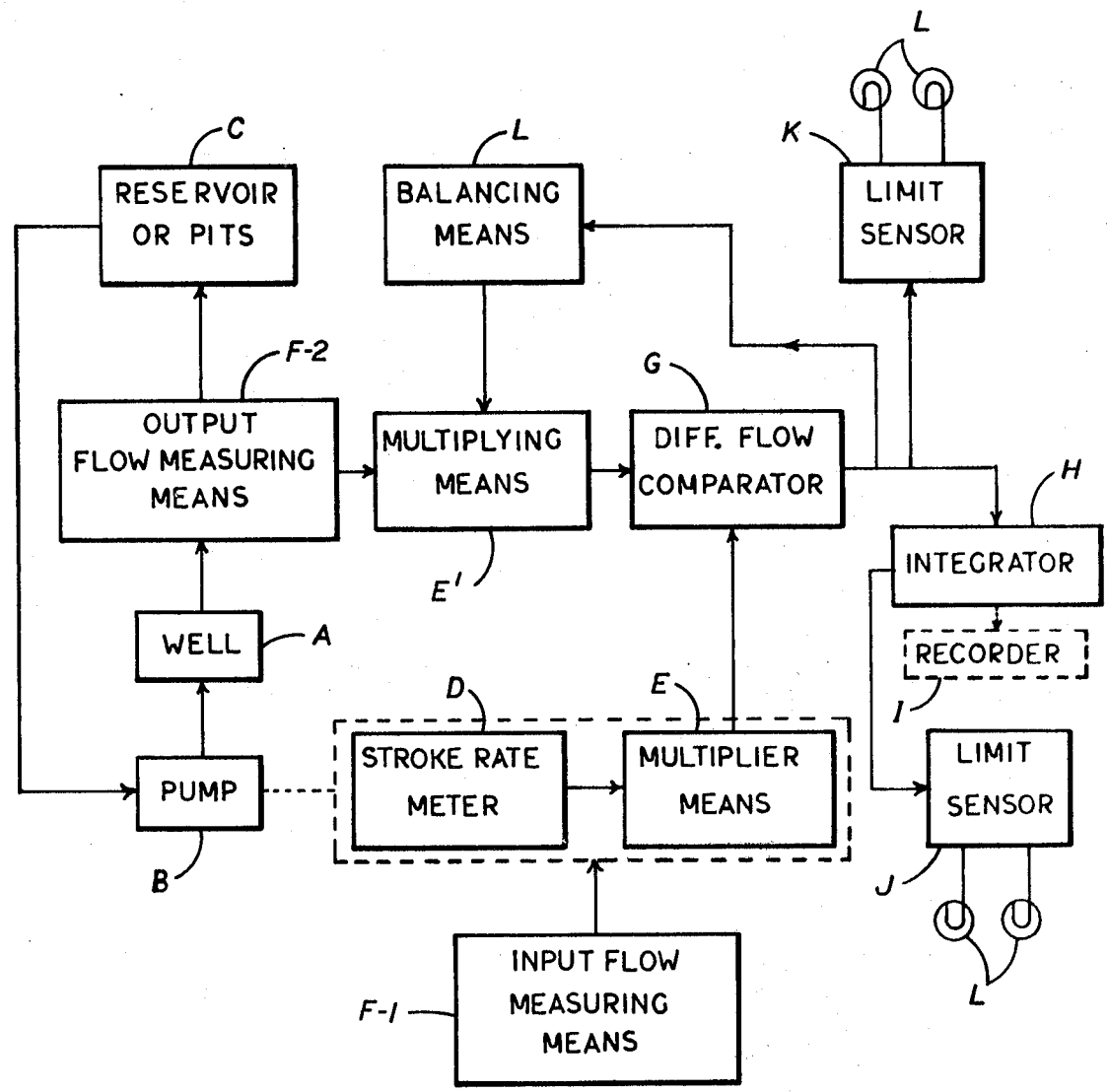
FIG. 1 is a schematic diagram of an electrical analogue computer system for monitoring the input and output fluid flows of a well drilling operation in accordance with the principles of my invention.

In FIG. 1 of the drawing is shown a well A formed during earth boring operations such as when drilling an oil well. A reciprocating type pump B receives input drilling fluid from a reservoir C and discharges the fluid into the well. The input fluid flow into well A enters through the interior of a string of drill pipe (not shown), and the output flow of the well returns to the surface between the annulus defined by the exterior of the drill pipe and the well bore, thereafter returning to the reservoir C. To determine the volume of fluid pumped into the well an input flow measuring means F-1 is utilized and in this instance consists of a stroke rate meter D and a multiplier E, both of which cooperate to produce an electrical analogue of the input fluid flow rate. The output fluid flow from well A is determined through utilization of an output flow measuring means F-2 and a multiplier E' that create an electrical analogue of the output fluid flow rate.

The electrical analogues from both the input flow measuring means F-1 and the output flow measuring means F-2 are fed into a differential flow comparator G which has an output equal to he difference between the analogues supplied by the output flow measuring means F-2 and the input flow measuring means F-1.

An integrator H is connected with the differential flow comparator for the purpose of determining total gain or loss of drilling fluid. A recorder I may be provided, as shown in phantom, to permanently record the total gain or loss of fluid. And in addition, a limit sensor J is connected with the integrator and a second limit sensor K is connected with the output of the differential flow comparator for the purpose of alerting with suitable signaling devices L the operator as to alterations in the differentiated and integrated fluid flow rates.

Since the operator may expect to encounter imbalanced readings between the input and output fluid flows in some situations when his experience indicates the flows are in reality balanced, a balancing means L is provided to equalize the inputs to the differential flow comparator G.

Figure 2A:
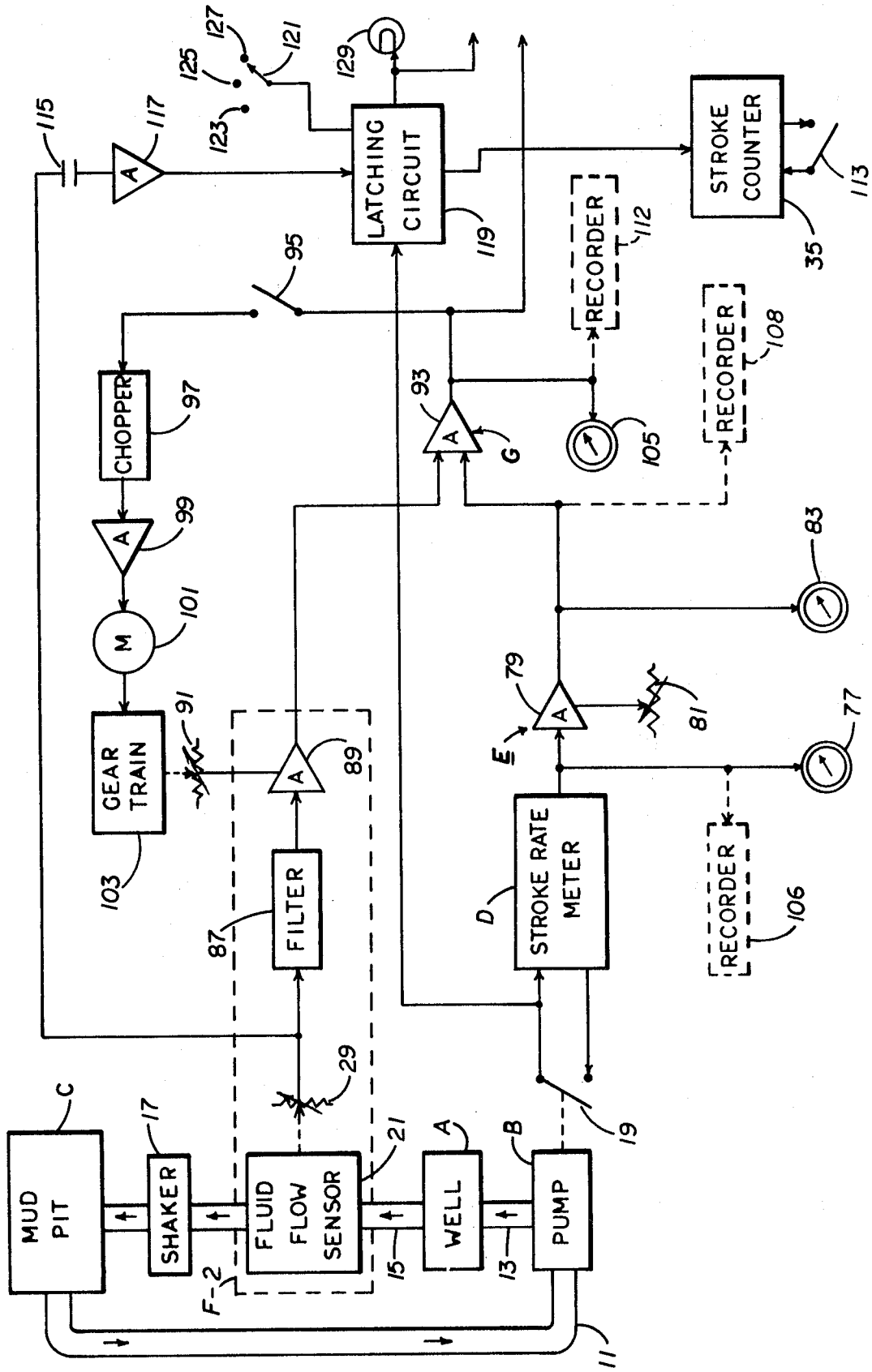
FIGS. 2A and 2B are schematic diagrams showing in greater detail the features of my system.
Figure 2B:
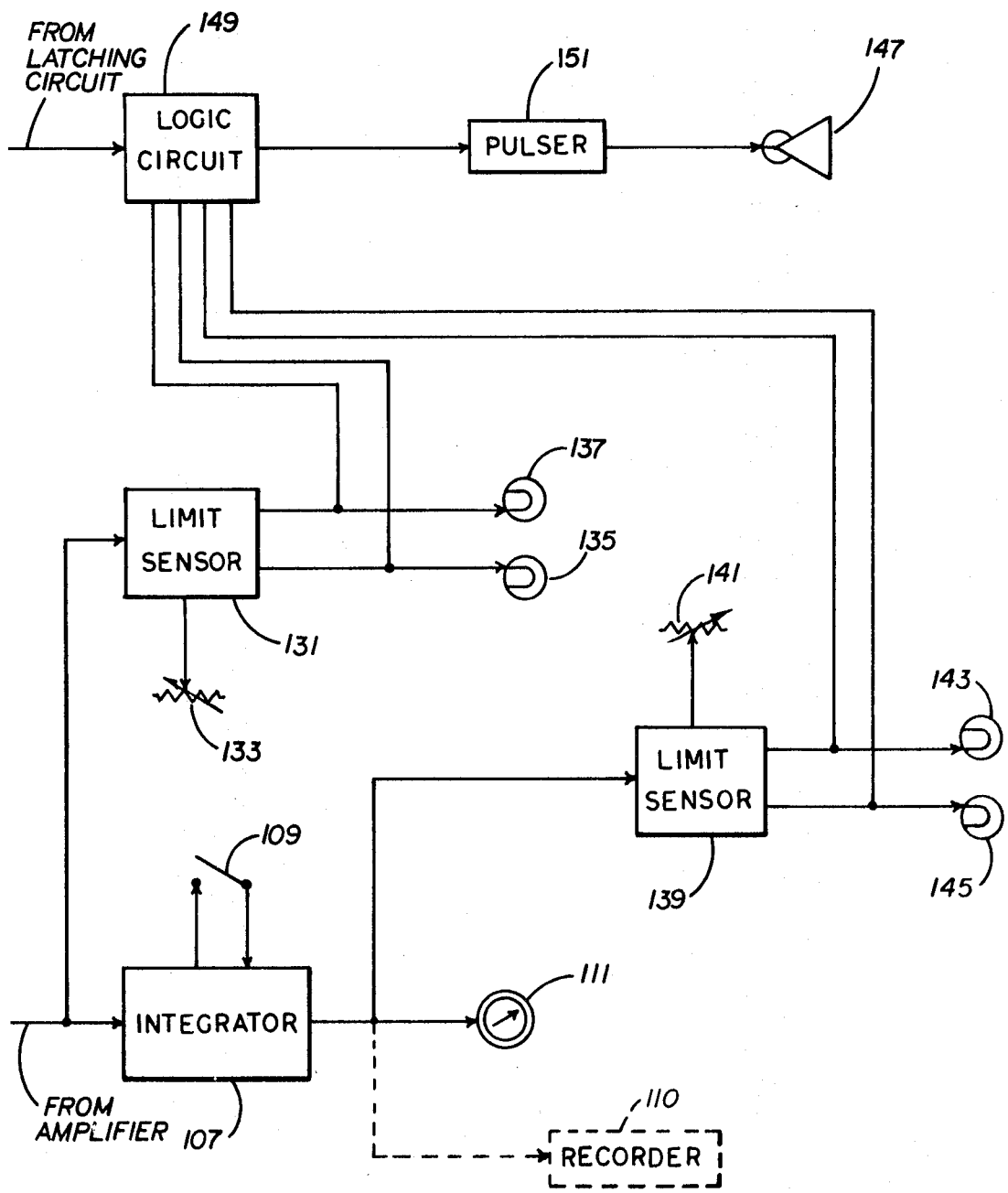

Referring now to FIG. 2, drilling fluid or mud is stored in one or more of the reservoirs or pits C and is fed through an intake pipe 11 to one or more piston type mud pumps B. The pump B forces fluid into well A through conduit 13 leading to the interior of the string of drill pipe (not shown). Fluid returning from the bottom of the bore hole is led back to the pit C through a conduit 15 and generally a shale shaker 17.

An electrical switch 19 (which is one form of transducer for sensing the mechanical motion of the pump and converting it into an electrical signal) is secured to the mud pump B and arranged such that the switch closes and opens once with each cycle of the pump.

Figure 4:
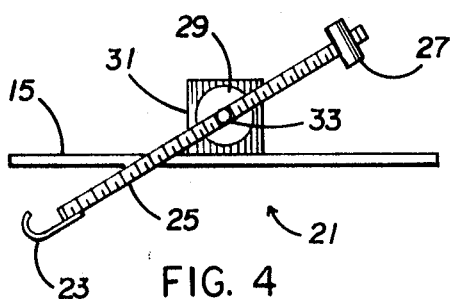
FIG. 4 is a side elevation view of a preferred embodiment of a well fluid output flow sensor.

Interposed in the conduit 15 containing the fluid output of well A is a fluid flow sensor 21, the position of which is influenced by the level or force of the fluid flowing through the conduit 15. As illustrated schematically in FIG. 4, the sensor 21 may preferably consist of a curved piece of metal 23 disposed in the well output conduit 15, being attached to a threaded arm 25 having an adjustable counterweight 27 threaded on the end opposite the curved metal 23. An electrical potentiometer 29 is supported by suitable mounting means 31, with the threaded arm 25 being mounted to the shaft 33 of the potentiometer 29.

The threaded arm 25 allows the length of the arm from the potentiometer shaft 33 to the curved metal 23 to be adjusted by rotating the arm such that the curved metal 23 lightly touches the bottom of the conduit 15, the system then being statically balanced by adjustment of the position of adjustable counter weight 27. Deflection of the arm 25 responsive to fluid flow causes rotation of the potentiometer 29 and transmission of an electrical signal proportional to the angular displacement from the reference position. The resulting electrical signal is fed to the electrical analogue computer unit as will be described subsequently.

Figure 3:
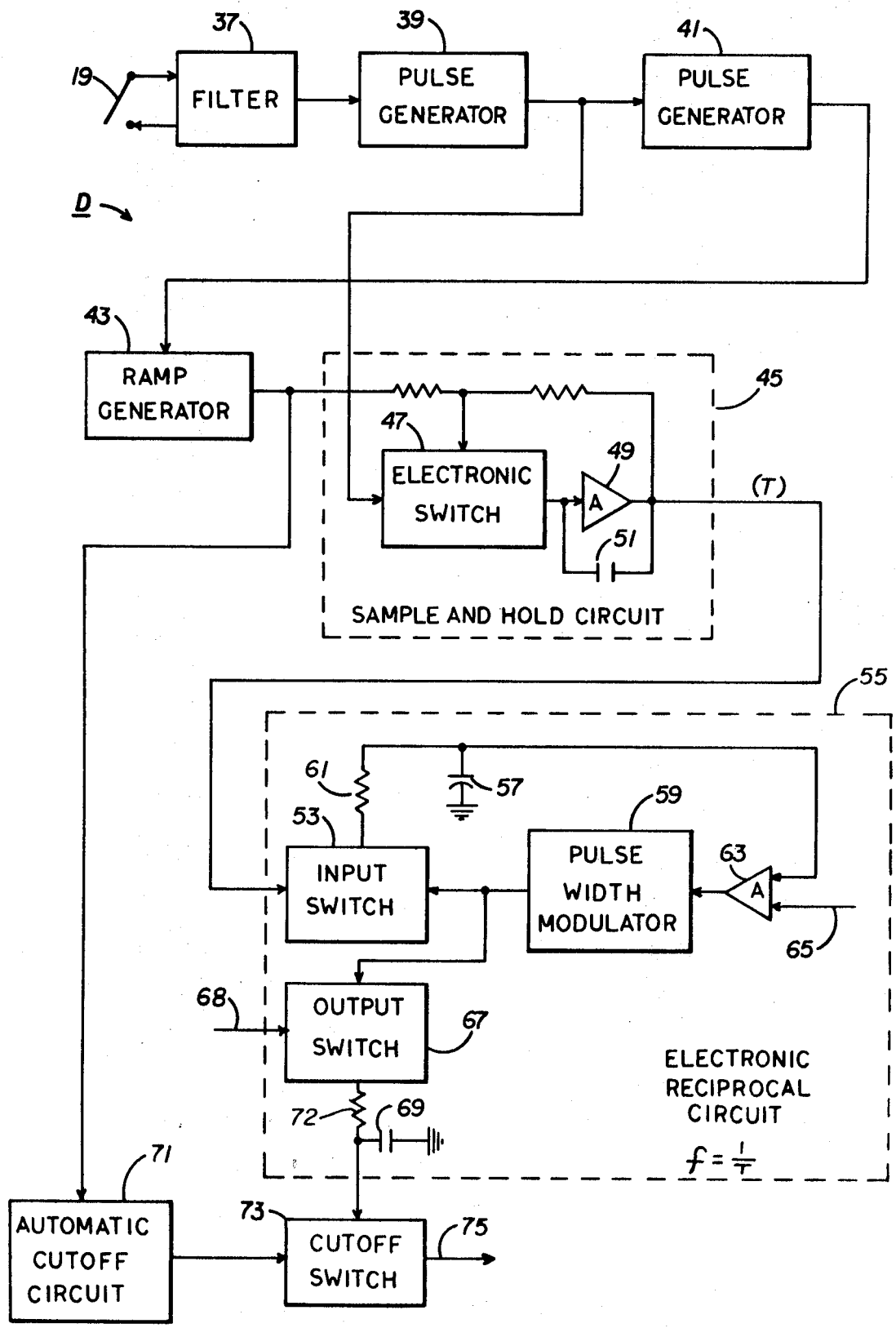
FIG. 3 is a schematic diagram showing a preferred embodiment of a stroke rate meter utilized in my system.

The switch 19 transmits an electrical pulse for each stroke of pump B to a group of electronic circuits known collectively as the stroke rate meter D (see FIG. 3) that converts these pulses into an analogue voltage directly proportional to the pump stroke rate. In addition, the electrical pulse from the switch 19 is also used to actuate a pump stroke counter 35 as will be described subsequently.

The stroke rate meter D converts the pulses sent by the electrical switch 19 to an analogue voltage directly proportional to the pump rate by measuring the time (T) between pulses and electronically solving the equation: Pump rate (f) equals the reciprocal of the time (T) between pulses. Such a system has significant advantages over a pulse integrating system in which the pulse averaging time must typically be several times the largest time interval between pulses. In well drilling operations the pump B may run at a slow speed in which six seconds or longer may elapse between successive pulses, resulting in a long lag between the instant of pump speed change and its final indication as given by a pulse averaging system. The stroke rate meter of this invention provides almost instantaneous indications of the mud pump speed change by measuring the time interval between two successive pulses and converting this time interval to an electrical signal directly proportional to pump rate.

The electrical pulses from the mud pump switch 19, upon transmission to the group of electronic circuits known as the stroke rate meter D, first passed through a filter 37 (referring now to FIG. 3), the function of which is to eliminate any false pulses due to contact bounce of the switch 19 and to provide a uniform amplitude pulse for triggering a first pulse generator 39. Such generator provides a sample pulse of fixed width and amplitude regardless of the length of pulse transmitted by the switch 19. The decay of such generator 39 triggers a second pulse generator 41 and in turn generates a reset pulse of fixed width and amplitude, the latter pulse being used to reset a monotonic function, in this instance a ramp, generator 43 to zero output voltage. The ramp generator 43 generates a voltage which linearly increases from zero starting at the time of decay of the reset pulse and rising at a rate in volts per second until the occurrence of the next reset pulse, that is, until the next closure of switch 19. The linearly increasing or ramp voltage is fed into a sample and hold circuit 45 that samples the ramp voltage by closing an electronic switch 47 for the duration of the sample pulse, said ramp voltage being impressed upon the input of a high gain direct current amplifier 49 having an output which charges a feed back capacitor 51. At the time of decay of the sample pulse, electronic switch 47 disconnects the output of the ramp generator 43 from the input of the high gain direct current amplifier 49 prior to the ramp generator being reset to zero by the reset pulse from the second pulse generator 41, the feed back capacitor 51 providing the energy to maintain the output of the amplifier 49 at the voltage level furnished by the ramp generator 43 at the time of the first sample until the next sample pulse occurs (i.e., until the next closure of switch 19). Thus is provided an output voltage (T) from the sample and hold circuit 45 directly proportional to the time interval between successive closures of switch 19.

The output voltage (T) from the sample and hold circuit 45 is fed to the input switch 53 of an electronic reciprocal circuit 55, the function of the input switch 53 being to charge and discharge a capacitor 57 connected with the switch in response to pulses from a pulse width modulator 59. The time duration during which the input switch 53 will charge the capacitor 57 is inversely proportional to the signal from the DC amplifier 49 of the sample and hold circuit 45 because of the pulse width modulator 59. The capacitor 57 and input switch 53 are further connected in series with a resistor 61 to form an integrating network, with the resulting average voltage on capacitor 26 being the input voltage (T) to the input switch 53 times the quantity —the charging time divided by the charging time plus the discharging time.

The voltage impressed upon capacitor 57 is applied to one input channel of a high gain DC amplifier 63, while a reference voltage supplied to input 65 corresponding to the integer one is applied to the other input channel of the DC amplifier 63. If a difference in magnitude exists between the voltage on capacitor 57 and the reference voltage supplied to input 65 of the amplifier 63, the output of the amplifier will change in a direction to modify the pulse output of the pulse width modulator 59 so as to change the ratio of the charge time versus the discharge time of the input switch 53 in such a manner as to make the voltage on the capacitor 57 equal in magnitude to the reference voltage of input 65. The result is a train of pulses from the pulse width modulator 59 whose ratio of charge pulse width to discharge pulse width is inversely proportional to the voltage (T).

The train of pulses from the pulse width modulator 59 is impressed upon an output switch 67, together with a calibrate reference voltage supplied to an input 68 such that the voltage impressed upon a capacitor 69, due to the integrating action of the capacitor 69 and a resistor 72, equals the calibrate reference voltage supplied through input 68 times the ratio of the charge pulse width to the discharge pulse width. Since the ratio of the charge pulse width to the discharge pulse width is inversely proportional to the voltage (T), the voltage on the capacitor 69 is inversely proportional to the voltage (T) times the calibrate reference voltage supplied by input 68 which is suitably scaled to make the voltage on the capacitor 69 directly proportional to the mud pump stroke rate.

If the mud pump B is stopped, the voltage (T) will exist for a long period due to the action of a sample and hold circuit 45 and will result in an output voltage on capacitor 69 indicating the mud pump B were running, thus giving an erroneous output signal. To prevent this an automatic cutoff circuit 71 is connected with the output of the ramp generator 43 to sense when its output voltage has risen to the value indicating a longer period between pulses from the pump switch 19 than could exist if the mud pump were running at its slowest possible rate. When this occurs, the automatic cutoff circuit 71 transmits a signal to a cutoff switch 73, causing the voltage from the output 75 of switch 73 to fall to zero corresponding to zero pump rate regardless of the voltage on the capacitor 69.

The direct current voltage which is proportional to the mud pump stroke rate and which is generated by the group of electronic circuits known collectively as the stroke rate meter D, is presented on an electrical member 77 (see FIG. 2) suitably calibrated to indicate to the operator the mud pump stroke rate in strokes per minute. This signal may also be transmitted to a suitable recorder 106 to provide a historical record and is connected with a high gain DC amplifier or multiplier means 79, which could be of another form such as an adjustable attenuator if amplification or a gain of less than unity is required.

The mud pump B, being of the piston type, is positive displacement so that the rate of flow of drilling fluid from the pump can be related directly to pump rate knowing the volume of mud displaced by the pump per stroke and other factors such as pump efficiency. Under varying conditions the operator may at his discretion modify the capacity of the mud pump B by changing its pistons and cylinders for example to produce different volumes of fluid output capacity. Thus, it is advantageous that the voltage transmitted by the stroke rate meter D be multiplied by a variable range of constants to develop a voltage of the proper scale factor for each pumping situation. The high gain DC amplifier 79 includes an operator adjustable potentiometer 81 for adjusting the gain of the amplifier to obtain the proper multiplying factor to the pump rate signal. Thus, it is possible to obtain an output from amplifier 79 directly proportional to the fluid output of pump B. This voltage is presented on an electrical meter 83 suitably calibrated to indicate the drilling operator the input flow of drilling fluid into the well A. A suitable recorder 108 may be provided to obtain an historical record of this data.

An electrical signal proportional over small increments of flow is developed by the well fluid output flow sensor 21 through potentiometer 29 and a smoothing filter 87, the function of which is to average the signal variations from the sensor 21 due to variations in the flow rate and the presence of solid particles being carried from the bore hole bottom. An additional function of the smoothing filter 87 is to provide a lag in the signal to minimize the large apparent variations in flow caused by such normal drilling procedures as raising and lowering the kelley. The smooth voltage which is proportional to the deflection of arm 25 of the sensor 21 and therefore proportional to the fluid output of the well A is presented to the input of a high gain DC amplifier or multiplier 89 which includes a potentiometer 91 for adjusting the gain of the amplifier.

The inflow signal derived from the output of the DC amplifier 79 connected with the stroke rate meter D and the outflow signal derived from the output of the DC amplifier 89 connected with the smoothing filter 87 are impressed upon separate inputs of a differential comparator G, which here is a high gain DC amplifier 93, in a manner to be subtractive. The output of the amplifier 93 is a signal which is proportional to the difference in two signals which are electrical analogues of the fluid input flow and the fluid output flow of well A, provided the system has started with an initial balance between these flows so as to enable the fluid flow sensor 21 to sense proportional changes in the fluid output flow of the well.

Initial balance of the system is accomplished at the discretion of the operator by depressing a balance switch 95 connected with the output of the DC amplifier 93 and to a chopper circuit 97, the function of which is to change the polarity sensitive DC differential flow signal voltage into a phase sensitive alternating current AC signal suitable for amplification by an amplifier 99, the function of which is to drive a servomotor 101. This motor rotates in a direction determined by the phase of a signal received from the amplifier 99 at a speed proportional to the amplitude of this signal. Since the phase and amplitude of the voltage driving the servomotor 101 are directly related to the polarity and magnitude of the differential flow signal due to the action of the amplifier 99 and the chopper circuit 97, the servomotor will rotate in such a manner as to adjust the gain of the DC amplifier 89 of the output flow measuring means F-2 by adjusting the potentiometer 91 connected with a gear reduction train 103 so that the outflow signal appearing at the output of the DC amplifier 89 is equal to the inflow, causing the signal appearing at the output of the DC amplifier 93 to become zero, thus placing the system in balance. Any differential flow signal from the differential flow comparator G is presented on a suitably calibrated electrical meter 105 to indicate to the operator any gain or loss of drilling fluid in well A. A recorder 112 may be provided to preserve a historical record of any gain or loss.

During drilling operations, the normal oscillations in output fluid flow from well A, due to the action of the drill string and other factors, cause short duration fluctuations in the output signal of the differential flow comparator G (amplifier 93) indicated to the operator on electrical meter 105. These normal oscillations tend to disguise the small gain or loss of drilling fluid in the well due to their random nature. To improve the ability of the system to accurately detect gain or loss of drilling fluid in the well, the differential flow signal from the amplifier 93 is impressed upon the input of an electronic integrator 107 that provides actual time integration of the differential flow signal. The integrator output is a signal directly proportional to the gain or loss of drilling fluid. The integrator 107 may be reset to zero periodically at the discretion of the drilling operator by using a panel mounted reset switch 109. The total gain or loss signal is presented on a suitably calibrated electrical meter 111 to indicate to the operator the total gain or loss of drilling fluid. Also, a recorder unit 110 may be provided for the purpose of obtaining an historical record.

To provide the operator with the actual number of strokes used during a well fill-up or similar operation, a stroke counter 35 is included, said counter having the ability to reset to a count of zero at the discretion of the operator by actuation of a panel mounted reset switch 113. The potentiometer 29 of the output flow sensor F-2 is connected in series with a capacitor 115, a high gain amplifier 117, a latching circuit 119 and with the stroke counter 35. Signals from the switch 19 are transmitted to the latching circuit 119, which has three modes of operation as determined by the drilling operator using a counter control switch 121. With the counter control switch 121 in the "count" position to contact terminal 123, the pulses from the mud pump switch 19 are used to actuate the stroke counter 35 on the basis of one count per switch 19 closure. With the controlled counter switch 121 in the "off" position to contact terminal 125, the counter 35 is disconnected from all inputs. With the counter control switch 121 in the "fill-up" position to contact terminal 127, the counter 35 will count pump strokes until the occurrence of a fill-up. In this instance the mud pump B is activated to force fluid into the well A. However, since the well bore will not be filled with fluid during such instances, no fluid exits the well through conduit 15. Once fluid fills the well bore, it starts to fill conduit 15 and deflects the arm 25 (see FIG. 4) of the fluid flow sensor 21 (see FIG. 2). The deflection results in an abrupt increase in electrical output transmitted by the flow sensor, such signal being differentiated by capacitor 115 and applied to the input differentiated by capacitor 115 and applied to the input of the amplifier 117, there being amplified to a level necessary to trigger the latching circuit 119. Consequently, the latching circuit disconnects the counter 35 from the pump switch 19. The counter is thereby stopped to provide a reading of the total number of strokes required to fill the well and concurrently may light an indicator light 129. The counter 35 remains disconnected from the switch 19 and the indicator light 129 remains lighted until the counter control switch 121 is placed in the "off" or "count" positions associated with terminals 123, 125.

During drilling operations it is possible a condition will arise which requires corrective action, such condition possibly going unnoticed even through shown on the various previously described meters. To forcefully bring a condition to the attention of the operator, warning devices in the form of indicator lights and a horn are provided. In this regard, a limit sensor circuit 131 monitors the output of the DC amplifier 93, which provides an electrical analogue proportional to the differential fluid flow. The limit sensor 131 has as a part of its network a panel mounted potentiometer 133 by which the operator may select that level of differential flow which then exceeded will cause a flow loss indicator 135 or a flow gain indicator 137 to light. In a similar manner a limit sensor circuit 139 monitors the output of the electrical integrator 107 whose terminal signal is proportional to the total gain or loss of fluid flow. The limit sensor 139 has as a part of its network a panel mounted potentiometer 141 with which the operator may select what total gain or loss of drilling fluid which when exceeded will cause total loss indicator 143 or total gain indicator 145 to light. For an additional alerting means, a warning horn 147 is incorporated to call the drilling operator's attention to an "out-of-limit" condition, should his attention be directed otherwise. A logic circuit 149 is connected with and continuously monitors the limit sensors 131 and 139 and the latching circuit 119 such that when a condition exists to cause one or more of the indicators to be lighted, a signal is transmitted to a pulser 151 connected with the logic circuit to electronically pulse the warning horn at selected time intervals.

The previously mentioned lights, the horn and the meters are all forms of indicator means, which is a term encompassing analogue devices as well as various forms of "read-out" devices.

While I have shown my invention in only one of its forms, it should be apparent to those skilled in the art that it is not so limited, but is susceptible to various changes and modifications without departing from the spirit thereof.

I claim:

1. In a fluid flow monitoring system for well drilling operations which utilize a pump to produce well input and output fluid flow, the combination comprising:
   an electrical transducer connected with and periodically actuated by the pump;
   a monotonic function generator electrically connected with said transducer;
   sample and hold circuit means connected with said transducer and said generator for providing a voltage directly proportioned to the time between successive transducer actuations; and
   reciprocal circuit means connected with the sample and hold circuit means for determining the reciprocal of the voltage from the sample and hold circuit means.

2. The system defined by claim 1 which further comprises cutoff circuit switch means connected with the generator and the reciprocal circuit means to ground the output of the generator when its generated voltage rises to a higher value than could exist if the pump were running at its slowest rate.

3. The system defined by claim 1 in which said monotonic function generator is a ramp generator.

4. In a fluid flow monitoring system for well drilling operations which utilize a pump to produce well input and output fluid flow, the combination comprising:
   a stroke rate meter actuated by the pump and having a voltage output which is an electrical analogue of the frequency of the pump;
   multiplier means connected with the stroke rate meter and having a voltage output which is an electrical analogue of the fluid input to the well;
   an output flow sensor communicating with the fluid output of the well, said sensor having a voltage output which is an electrical analogue of said fluid output;
   an adjustable gain amplifier connected with the output flow sensor, the gain of such amplifier being adjustable for balancing the output of the output flow sensor and the multiplier means;
   a differential flow comparator connected with the multiplier means and the adjustable gain amplifier and having an output which is the difference between the output voltages of the adjustable gain amplifier and the multiplier means;
   indicator means connected with the output of the comparator.

5. In a fluid flow monitoring system for well drilling operations which utilize a pump to produce well input and output fluid flow, the combination comprising:
   input flow measuring means connected with the pump for measuring the quantity of fluid pumped into a well, said means producing an electrical output analogue of said flow;
   output flow measuring means sensing the quantity of fluid discharged from the well and producing an electrical output analogue of said flow;
   a differential flow comparator connected with said electrical analogue outputs and having an output which is the difference between them;
   integrator means connected with the differential flow comparator to accumulate differential flow therefrom;
   indicator means connected with the output of the integrator means.

6. The system defined by claim 5 which further comprises an adjustment means connected with the output flow measuring means for balancing the output thereof with the output of the input flow measuring means.

7. The system defined by claim 5 in which the integrator means is a capacitor.

8. In a fluid flow monitoring system for well drilling operations which utilize a pump to produce well input and output fluid flow, the combination comprising:
   an electrical transducer connected with and periodically actuated by the pump;
   latching circuit means connected with said electrical transducer;
   a stroke counter connected with said latching circuit means;
   an output flow sensor connected with the latching circuit means and communicating with the fluid output of the well, said sensor having a voltage output which is an electrical analogue of said fluid output;
   said latching circuit means disconnecting the stroke counter from the electrical transducer when the voltage from the output flow sensor increases responsive to the well filling with fluid.

9. The system defined by claim 4 which comprises:
   a switch connected with the differential flow comparator;
   a servomotor connected with the switch and driven in a direction to adjust the output of said second multiplier means to stop the voltage output of said comparator.

10. In a fluid flow monitoring system for well drilling operations which utilize a pump to produce well input and output fluid flow, the combination comprising:
    well input flow sensor to generate an electrical analogue of the fluid input to a well;
    an output flow sensor communicating with the fluid output of the well, said sensor having a voltage output which is an electrical analogue of said fluid output;
    multiplier means connected with the output flow sensor, the gain of such multiplier means being adjustable for balancing the output of the output flow sensor;
    a differential flow comparator connected with the output flow sensor and the multiplier means and having an output which is the difference between the output voltages of the adjustable gain amplifier and the input flow sensor;
    integrator means connected with the differential flow comparator;
    signaling means connected with the integrator means to warn of flow imbalance.

11. The system defined by claim 10 in which the multiplier means is an adjustable gain amplifier.

12. In a fluid flow monitoring system for well drilling operations which utilize a pump to produce well input and output fluid flow, the combination comprising:
    an electrical transducer connected with and periodically actuated by the pump;
    an arm communicating with the output flow of the well, the position of which is established by the rate of flow;
    a transducer connected with the arm to produce an electrical analogue of the arm position;
    a differential flow comparator connected with the transducer and the input flow sensor and having an output which is the difference between the output voltages of the transducer and the input flow sensor;
    an integrator means connected with the differential flow comparator.